No. 693,083. Patented Feb. 11, 1902.
J. B. TOURGON.
TIRE FOR VEHICLES.
(Application filed Sept. 24, 1901.)

(No Model.)

Witnesses
S. Brashears
M. C. Lyddane

Inventor
J. B. Tourgon
by G. Lithman
Atty

UNITED STATES PATENT OFFICE.

JOSEPH BARTHÉLEMY TOURGON, OF BAGNOLS-SUR-CÈZE, FRANCE.

TIRE FOR VEHICLES.

SPECIFICATION forming part of Letters Patent No. 693,083, dated February 11, 1902.

Application filed September 24, 1901. Serial No. 76,384. (No model.)

*To all whom it may concern:*

Be it known that I, JOSEPH BARTHÉLEMY TOURGON, a citizen of the French Republic, residing at Bagnols-sur-Cèze, Gard, France, have invented certain new and useful Improvements in Tires for Vehicles, of which the following is a specification.

The present invention relates to metal tires for cycle or other wheels formed with two rims rolled out until they have become the proper form and then soldered together on the whole circumference, or they may be of several sections soldered together, so as to leave no visible trace of solder, in order to obtain the two rims separately, which are then united together in the manner described.

The most suitable metals to be used for the manufacture of this tire are aluminium, steel, copper, aluminium bronze, and nickel, which permits to obtain light and strong non-puncturable rims, which thus advantageously replace the india-rubber tires.

Figure 1:
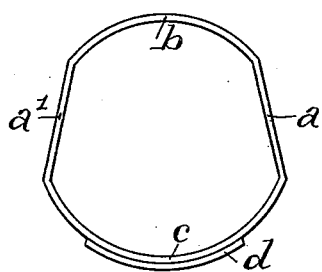

In the drawings, Figure 1 is a view in side elevation of a tire constructed in accordance with my invention. Figs. 2 to 6 are like views of slight modifications thereof.

Their manufacture is ordinarily coppersmith's work, and it requires great care, according to the metal employed. The copper, the aluminium, and the bronze must be treated specially—that is to say, must be hammered and rolled—whereas the aluminium bronze, which is very tenacious, may be soldered and hammered while hot but far from its fusion-point. The steel may be worked while hot, and it must be tempered up to the point where it acquires the greatest tenacity. Wires, bands, and more especially plates of the above metals will be used, upon which the lines of the shears cutting the pieces to be manufactured must first be traced and these pieces then hammered, rolled, and even drawn, if necessary, for tempering.

Figure 2:
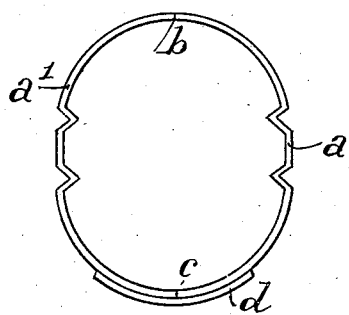
Figure 3:
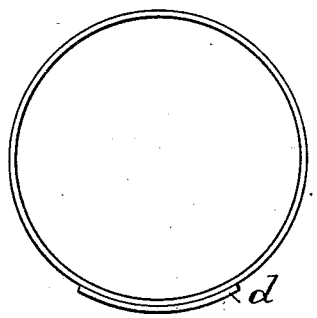
Figure 6:
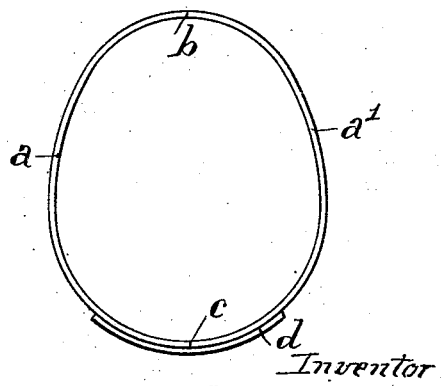

The types illustrated in Figs. 1, 2, and 6 of different forms will be cut in one piece without solder on the wearing-face. For this purpose they are provided with two metal rims $a\ a'$ for both sides, rolled until they possess their respective form, cut exactly, and chamfered on the edges, both rims being then united and closely soldered together through the whole circumference of the band. The inner piece $b$, inside of the wheel, is covered by the felly, and the outer side $c$, running on the ground, is covered by the metal piece $d$ for strengthening the band and then fixed in any suitable way.

Figure 4:
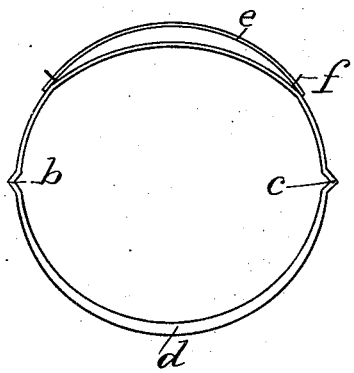
Figure 5:
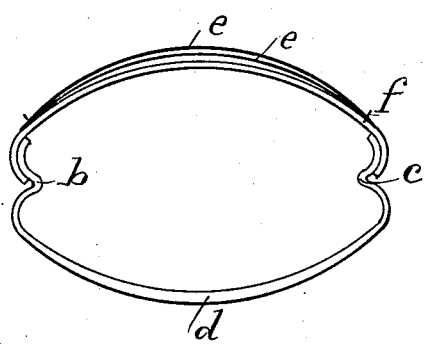

The types illustrated in Figs. 4 and 5, so-called "pincher" types, are constructed in the same manner as above described, except that the soldering is effected in the middle of both sides at the points $b$ and $c$. The pinching spring-blades $e$, two or three in number, are placed outside and are held by pins fixed within the rims. These tires may be made in several sections. The metal is hammered while in a vise and brought to the proper form, the ends of the sections chamfered, adjusted, and soldered together without leaving any outside trace, and each band-section added to the other until the rim is completed. Then the reinforcing metal piece $d$, running on the ground, is soldered on. The anvil-like vise used for this operation is specially constructed. Its two jaws are elongated and bent parallel to the portion of band to be shaped. By means of the screw of the vise both jaws are opened to correspond to the inner size of the above-mentioned band, and when the operation is ended the said jaws are again brought together by turning the screw, whereas the band-section, which has become independent, slides naturally and gets out without any strain. The same vise may also be used for making the cycle-band represented in Fig. 3, which is formed with a hollow band of aluminium wire or strip. It will be started by the lower end of the vise being set at its opened point. Then the band must be heated, hammered, and soldered as the work progresses. When at the end of the vise-jaw, it will be started from below, and so on until entire completion. Thereafter both ends of the band must be soldered together in proper size or circumference without leaving any visible trace of solder at the outside. Finally, the manufactured metallic bands will be tightly fixed to the wheel-felly prepared for this purpose by any suitable arrangement. By heating the bands at the time of fixing them upon the fellies I use the contraction of the metal in cooling.

The walls through which the elasticity is produced must not support any rigid attachment surrounding the same and reducing their necessary flexibility. The sizes of the metals vary according to the use and to the strain they must undergo in use. The bands may be of any form in cross-section, such as a circular shape, egg-shape, trapezoidal shape, and the like. Thus provided with these tires the cycle is ready to run on any muddy or stony ways without having to fear damage and is applicable alike for town and country. It is adapted for use by the attendants of the post-office, specially steady for the colonies and under the equator, and specially suitable for military purposes, deceiving the enemy, who might have thrown nails or broken glass on the road to be passed over.

Having thus fully described my invention, what I claim as new, and desire to secure by Letters Patent of the United States, is—

1. A tire for cycle-wheels and the like, made of suitable metal formed with two rolled rims hammered and soldered interiorly together throughout their whole circumference forming a tightly-closed crown and then each crown or rim formed of sectional arcs of circles soldered to each other, substantially as described.

2. A tire for cycle-wheels and the like, made of suitable metal formed with two rolled rims hammered and soldered interiorly together throughout their whole circumference forming a tightly-closed crown, pinching spring-blades secured to the band thereby providing for a greater elasticity, substantially as described.

In testimony whereof I affix my signature in presence of two witnesses.

JOSEPH BARTHÉLEMY TOURGON.

Witnesses:
ALBERT PHÉLINE,
FERNAND MAZELLIEN.